United States Patent
Chiang et al.

(10) Patent No.: US 9,934,120 B2
(45) Date of Patent: Apr. 3, 2018

(54) METHOD AND APPARATUS FOR UPDATING A SYSTEM ON CHIP (SOC) IMAGE FROM A HOST COMPUTER SYSTEM WITHOUT USING DMA

(71) Applicant: HGST Netherlands B.V., Amsterdam (NL)

(72) Inventors: Chuck Chiang, Sunnyvale, CA (US); Kishore Kumar Reddy Devireddy, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 135 days.

(21) Appl. No.: 15/040,962

(22) Filed: Feb. 10, 2016

(65) Prior Publication Data

US 2017/0228302 A1   Aug. 10, 2017

(51) Int. Cl.
   G06F 11/00   (2006.01)
   G06F 11/32   (2006.01)
   G06F 11/07   (2006.01)
   G06F 13/28   (2006.01)

(52) U.S. Cl.
   CPC ........ *G06F 11/327* (2013.01); *G06F 11/0709* (2013.01); *G06F 11/079* (2013.01); *G06F 11/0751* (2013.01); *G06F 13/28* (2013.01)

(58) Field of Classification Search
   CPC ....................................................... G06F 8/68
   See application file for complete search history.

(56) References Cited

U.S. PATENT DOCUMENTS

| | | | |
|---|---|---|---|
| 6,742,056 B2 | 5/2004 | Lee et al. | |
| 7,027,773 B1* | 4/2006 | McMillin | H04L 45/00 370/390 |
| 7,856,614 B2 | 12/2010 | Lu et al. | |
| 8,001,333 B2 | 8/2011 | Pong | |

(Continued)

FOREIGN PATENT DOCUMENTS

| | | |
|---|---|---|
| CN | 1752933 A | 3/2006 |
| CN | 100570558 A | 12/2009 |
| CN | 103761122 A | 4/2014 |

OTHER PUBLICATIONS

Khan et al, "SoPC Based Smart Home Embedded Computer Capable of Caring for the Home Occupants", Electrical and Computer Engineering, CCECE 2007; http://ieeexplore.ieee.org/xpl/articleDetails.jsp?arnumber=4232716; DOI 10.1109/CCECE.2007.57; pp. 206-209.

(Continued)

*Primary Examiner* — Christopher McCarthy
(74) *Attorney, Agent, or Firm* — Loza & Loza, LLP; Gabriel Fitch

(57) ABSTRACT

Embodiments of the present disclosure relate to systems and methods for updating a System on Chip (SOC) image without using direct memory access (DMA) programming. A target SOC monitors a target mailbox to determine reception of a data packet of an SOC image received from a host computer, wherein the SOC image includes a plurality of data packets. The target SOC reads the data packet from a buffer of the target SOC and writes a status message to a host mailbox of the target SOC, wherein the status message is indicative of a reception status of the data packet.

21 Claims, 7 Drawing Sheets

(56) References Cited

U.S. PATENT DOCUMENTS

| | | | |
|---|---|---|---|
| 8,578,148 B2* | 11/2013 | Iyer | G06F 13/4208 |
| | | | 713/1 |
| 8,607,216 B2 | 12/2013 | Ibrahim et al. | |
| 9,354,864 B2* | 5/2016 | Kamrowski | G06F 8/68 |
| 9,594,623 B2* | 3/2017 | Robertson | G06F 11/0793 |
| 2009/0282399 A1* | 11/2009 | Kamrowski | G06F 8/68 |
| | | | 717/174 |
| 2014/0068594 A1 | 3/2014 | Young et al. | |
| 2015/0149992 A1* | 5/2015 | Wade | G06K 7/0095 |
| | | | 717/173 |
| 2016/0283313 A1* | 9/2016 | Robertson | G06F 11/0793 |
| 2016/0299753 A1* | 10/2016 | Tseng | G06F 8/665 |
| 2017/0118042 A1* | 4/2017 | Bhattacharya | H04L 12/462 |
| 2017/0188178 A1* | 6/2017 | Vrabete | H04W 4/005 |

OTHER PUBLICATIONS

Microsemi Corporation, "SmartFusion cSoC—Programming FPGA Fabric and eNVM Using IAP Interface", Jan. 2015; http://www.microsemi.com/document-portal/doc_view/129818-ac362-smartfusion-csoc-programming-fpga-fabric-and-envm-using-in-application-programming-interface-app-note; 31 pages.

\* cited by examiner

METHOD AND APPARATUS FOR UPDATING A SYSTEM ON CHIP (SOC) IMAGE FROM A HOST COMPUTER SYSTEM WITHOUT USING DMA

FIELD

Aspects of the disclosure relates a method, device, and system for updating a System on Chip (SOC) image from a host computer.

BACKGROUND

A computer system generally includes one or more central processing units (CPUs), main memory, data storage device (e.g., hard disk drive, solid state drive), peripheral components, and peripheral interfaces such as network interface cards (NIC), host bus adapters (HBA). A computer system CPU may communicate with other computer systems through a network interface (NIC). Non-limiting examples of NIC include Ethernet, Wi-Fi, Bluetooth, Universal Serial Bus (USB), Firewire, etc. Within the same computer system, the CPU or processor may communicate with the peripheral components or devices through a local data connection or bus such as the Peripheral Component Interconnect (PCI) Express bus or PCIe.

In some applications, a computer system may be utilized to update a target System on Chip (SOC). An SOC is a single chip or integrated circuit that includes many components of a computer system. For example, an SOC may integrate the CPU, main memory, data storage, peripheral components (e.g., transceivers, modem), NIC, etc. The SOC typically has an operating system and a bootloader that are stored in a storage device (e.g. Flash memory). There are occasions that the software of the SOC in the form of an SOC image needs to be updated.

SUMMARY

One embodiment of the present disclosure provides a method for updating a system on chip (SOC) image operable at a target SOC. The method monitors a target mailbox of the target SOC to determine reception of a data packet of an SOC image received from a host computer, wherein the SOC image includes a plurality of data packets. The method reads the data packet from a buffer of the target SOC. The method further writes a status message to a host mailbox of the target SOC, wherein the status message is indicative of a reception status of the data packet. In this embodiment, the target SOC receives the SOC image from the host computer without using direct memory access (DMA).

One embodiment of the present disclosure provides a method for operating a host computer to update a system on chip (SOC) image of a target SOC. The method copies a first data packet of an SOC image to a buffer of the target SOC, wherein the SOC image includes a plurality of data packets. The method writes a first sequence number of the first data packet to a target mailbox of the target SOC. The method receives a status message from the target SOC, wherein the status message is indicative of a reception status of the first data packet. In this embodiment, the host computer copies the SOC image to the target SOC without using DMA.

One embodiment of the present disclosure provides a system on chip (SOC) system configured to update an SOC image without using direct memory access. The SOC system includes a processor, a buffer, a target mailbox, and a host mailbox. The buffer is coupled to the processor and configured to receive a data packet of an SOC image from a host computer via a communication interface, wherein the SOC image includes a plurality of data packets. The target mailbox is coupled to the processor and configured to receive a message from the host computer, wherein the message includes a sequence number of the data packet received in the buffer. The host mailbox is coupled to the processor and configured to provide a status message to the host computer, wherein the status message is configured to indicate a reception status of the data packet. In this embodiment, the SOC system receives the SOC image from the host computer without using DMA.

One embodiment of the present disclosure provides a host computer configured to update a SOC image of a target SOC. The host computer includes a processor, a communication interference configured to communicate with a target SOC, and a memory coupled to the processor and including an SOC update application. The processor when executing the SOC update application, is configured to copy a first data packet of an SOC image to a buffer of a target SOC, wherein the SOC image comprises a plurality of data packets. The processor is further configured to write a first sequence number of the first data packet to a target mailbox of the target SOC. The processor is further configured to receive a status message from the target SOC, wherein the status message is indicative of a reception status of the first data packet.

DETAILED DESCRIPTION

Figure 1:
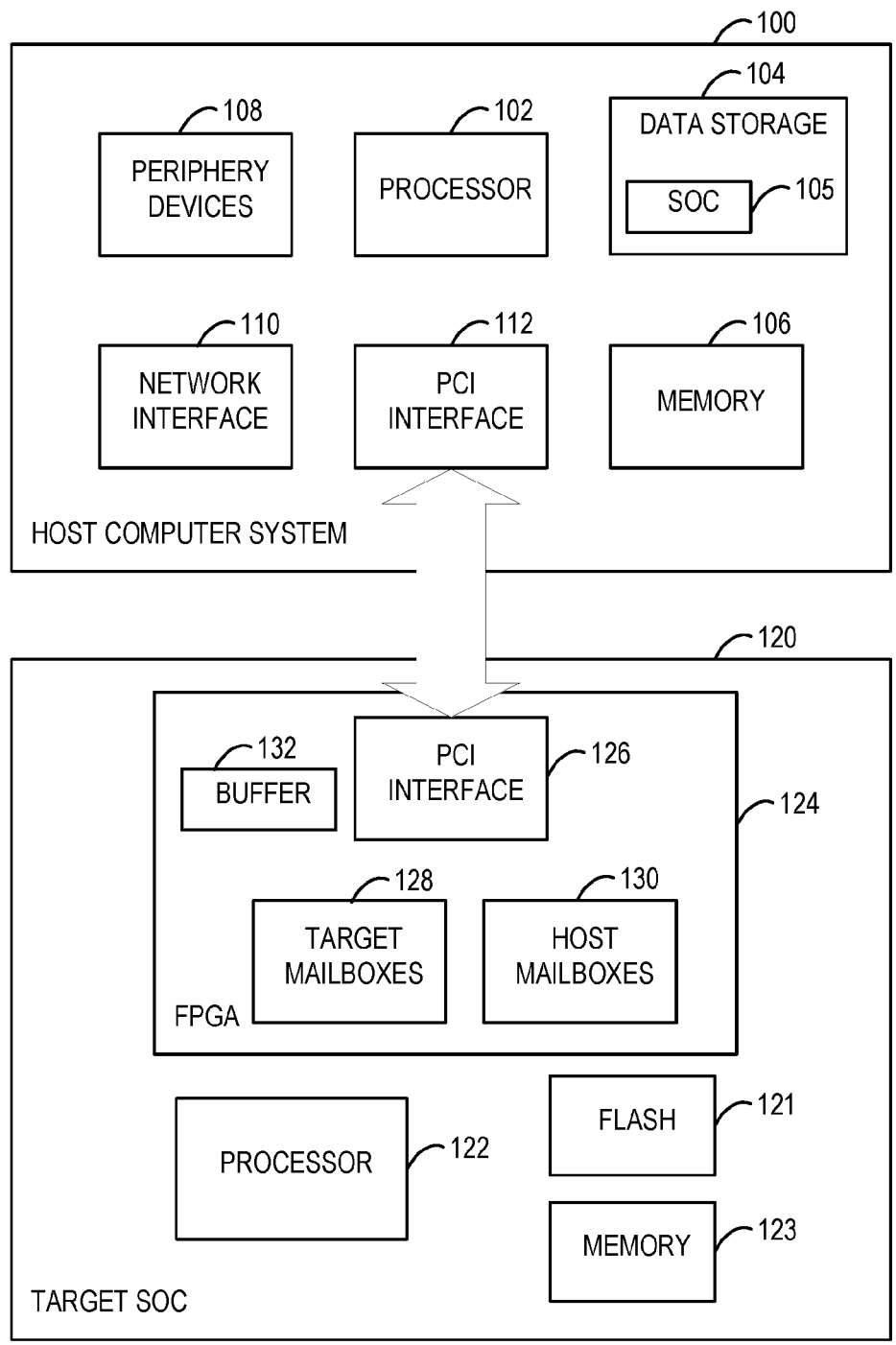
FIG. 1 is a block diagram illustrating a computer system configured to update a target System on Chip (SOC) in accordance with one embodiment of the disclosure.

Referring now to the drawings, embodiments of systems and methods for updating a System on Chip (SOC) image without using direct memory access (DMA) programming are illustrated. In several embodiments, a host computer system and a target SOC communicate using a mailbox mechanism to reliably copy and update a target image of the SOC.

FIG. 1 is a block diagram illustrating a computer system configured to update a target SOC in accordance with one embodiment. A computer system 100 (host) is configured to update the software and/or firmware of a target SOC 120. The computer system 100 includes one or more processors 102 (e.g., a central processing unit (CPU)), a data storage 104, a memory 106, periphery devices 108, one or more network interfaces 110, and a Peripheral Component Interface (PCI) bus interface 112. In some examples, the data storage 104 may be a hard disk drive, a solid state drive, or any suitable storage device for storing user data, programming software, and applications. In one embodiment, an SOC image update software 105 may be stored at the data storage 104 (e.g., non-transitory or non-volatile data storage devices). The SOC update software (executable instructions) may be executed by the processor 102 to perform various functions to update the target SOC 120. The processors 102, data storage 104, memory 106, periphery devices 108, network interfaces 110, and PCI bus interface 112 may be operatively coupled to each other via one or more data buses or other suitable connections. The PCI bus interface 112 may be configured to communicate with other PCI enabled devices according to the PCI standard (e.g., PCIe). PCI Express (PCIe) is a general purpose serial interconnect defined in the PCI standard. For examples, a PCIe connection may be used as a peripheral device interconnect, chip-to-chip interface, bridge to other protocol standards, and interconnect between systems.

In one embodiment, the computer system 100 may be coupled to the target SOC 120 via a first PCI interface 112 such that the computer system 100 can update the software and/or firmware of the target SOC 120. The target SOC 120 may have a flash memory 121 or other suitable non-transitory or non-volatile data storage devices for storing a software image (SOC image) that may be updated by the computer system 100. The target SOC 120 may further include other circuitry that is not shown and is not essential for the understanding of the present disclosure. In one embodiment, the target SOC 120 may be implemented as a PCI card or board.

In one embodiment, the target SOC 120 has a field-programmable gate array (FPGA) 124 that is configured to enable communication between the host computer system 100 and the target SOC 120 via a mailbox mechanism. The FPGA 124 may be configured/programmed using a hardware description language (HDL) or another suitable method as is known in the art. The FPGA 124 contains various programmable logic blocks and reconfigurable interconnects. In one example, the FPGA 124 may be configured to provide a second PCI interface 126, a number of target mailboxes 128, a number of host mailboxes 130, and a buffer 132. The logic blocks of the FPGA 124 can be configured to perform various functions such as combinational functions and simple logic gate functions. In some examples, the logic blocks also include memory elements (e.g., buffer 132). In one embodiment, some of the logic blocks are configured as the target mailboxes 128, host mailboxes 130, and buffer 132. The buffer 132 may be used to store data temporarily during SOC image update operations. In some embodiments, the FPGA 124 may be replaced with an application specific integrated circuit (ASIC) or other suitable circuitry configured to provide similar functions.

In some embodiments, the target SOC 120 may include one or more processors 122 or configurable processing units or modules. The target SOC 120 may utilize these processors, processing units, or processing modules to execute the software stored at the flash memory 121.

Figure 2:
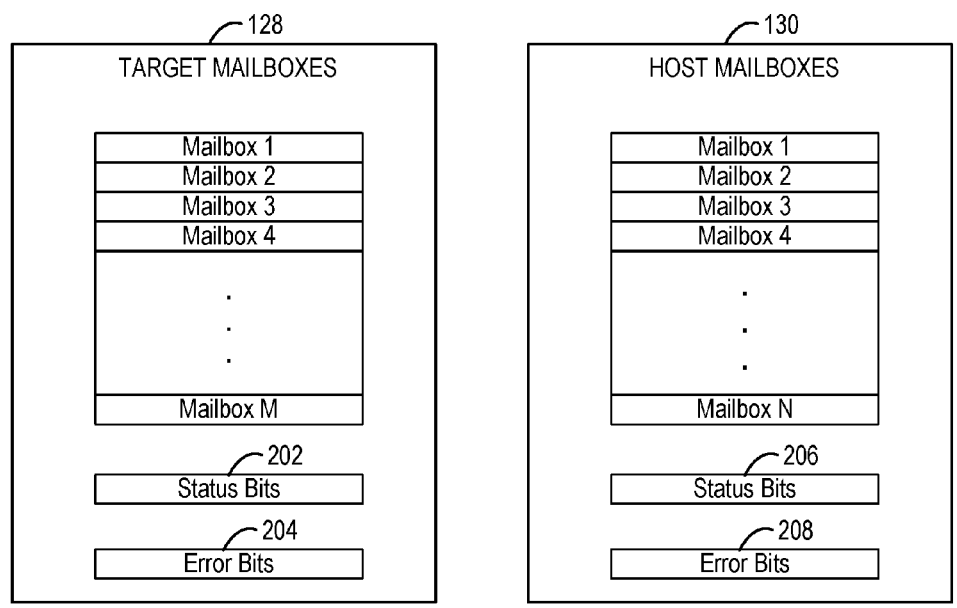
FIG. 2 is a block diagram illustrating examples of host and target mailboxes utilized to copy an SOC image without using direct memory access (DMA) in accordance with one embodiment of the disclosure.

FIG. 2 is a block diagram illustrating the target mailboxes 128 and host mailboxes 130 in more detail in one embodiment. In one example, the target mailboxes 128 may include M target mailboxes (e.g., M=8), and the host mailboxes 130 may include N host mailboxes (N=8). In other embodiments, the target mailboxes 128 and the host mailboxes 130 may have other suitable numbers of mailboxes that may be limited by the FPGA's hardware capability. Each mailbox may be 32 bits long or other suitable length. The mailboxes may be used for the same functions or different functions. The host mailboxes and target mailboxes may have the same or different lengths (i.e., number of bits). Furthermore, each of the target mailboxes 128 may be associated with a status bit 202 and an error bit 204. Similarly, each of the host mailboxes 130 is associated with a status bit 206 and an error bit 208.

When data is written to a mailbox (e.g., target mailboxes 128 or host mailboxes 130), the corresponding status bit (e.g., status bit 202 or status bit 206) is automatically set (e.g., bit value=1). In general, the status bits are utilized to indicate that a respective mailbox has new data. The error bit (e.g., error bit 204 or error bit 208) is set (e.g., bit value=1) if the corresponding mailbox (e.g., target mailboxes 128 or host mailboxes 130) has been written twice before it is read. In general, the error bit is utilized to indicate an error condition with a mailbox. The buffer 132 and the mailboxes 128 and 130 may be utilized to copy a target SOC image to a target SOC 120. For example, after a data packet is copied into the buffer 132, the sequence number of the data packet is written to a target mailbox 128. As a result, a corresponding status bit 202 is set, hence indicating the availability of data in the buffer. When the target SOC 102 reads the data packet from the buffer 132, the corresponding status bit and error bit are automatically cleared.

The host and target mailboxes and the status and error bits may be utilized to facilitate mailbox based communication between the computer system 100 and the target SOC 120 without using DMA programming. Implementing DMA in a FPGA increases design complexity. The disclosed mailbox communication methods offer simpler solutions for copying and updating a target SOC image.

Figure 3:
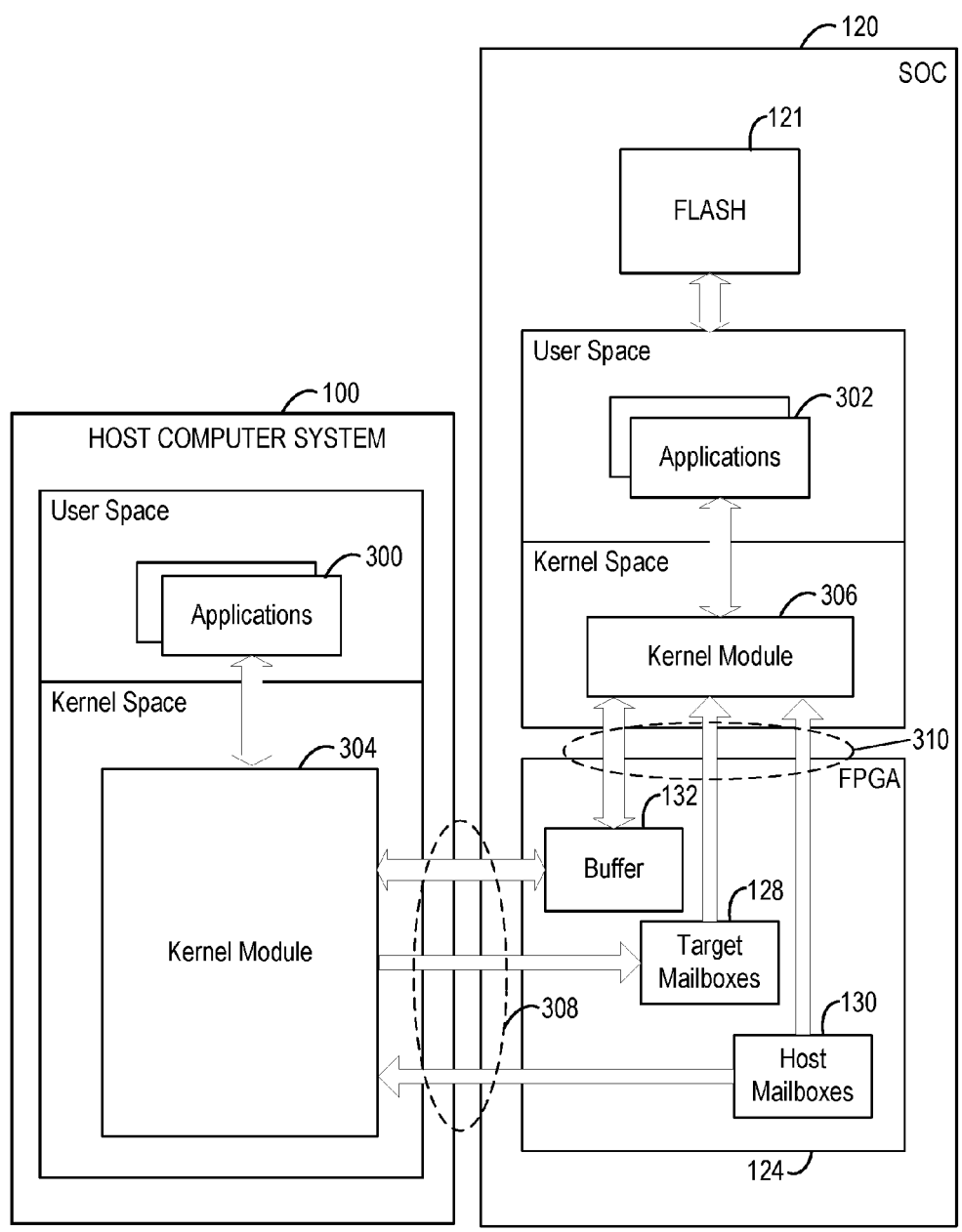
FIG. 3 is a diagram illustrating an address space organization and data communications between a host computer system and a target SOC in accordance with one embodiment of the disclosure.

FIG. 3 is a diagram illustrating an address space organization and data communications between the host computer system 100 and the target SOC 120 in one embodiment. The host computer system 100 (hereafter "host") has access to a physical address space and a virtual address space. These address spaces may be divided or arranged into an application address space (user space) and a kernel address space (kernel space). The various components (e.g., peripheral components and interfaces) of the host computer system 100 and target SOC 120 are assigned to their corresponding address spaces. For example, the applications 300, 302 of the host and target SOC are assigned to their respective user spaces. The applications 300, 302 can access their respective kernel modules 304 and 306, which operate in the kernel spaces. One of the applications 300 may be an SOC image update software 105 (see FIG. 1).

The peripheral components (e.g., periphery devices, network interfaces, PCI interface) may be mapped to the kernel virtual address space, and the kernel modules 304 and 306 can read and write into this address space (kernel space). The host's user space application 300 can send and receive data to/from the host kernel module 304. The host 100 may connect to the target SOC 120 through a PCI express (PCIe)

bus 308 or other suitable connections. In other examples, the host 100 may connect to the target SOC 120 through other connections such as USB, IEEE 1394 (FireWire), conventional PCI, Thunderbolt, Wi-Fi, Bluetooth, or the like. The host application 300 may have a driver that maps the PCI address space to the kernel and/or user space. The PCI address space includes the buffer 132, target mailboxes 128, and host mailboxes 130.

The host application 300 may utilize an input output interface (e.g., input/output control (Ioctl)), which may be provided by the kernel module 304, to send and receive data to the target SOC 120 via the PCIe bus 308. For example, the host application 300 can send and receive data to/from the buffer 132, send/write data to the target mailboxes 128, and receive/read data from the host mailboxes 130.

In one embodiment, the FPGA 124 further provides a non-PCI connection 310 for communication with a target kernel module 306 such that a target user application 302 (target application) can send and receive data to/from the FPGA 124. The target SOC 120 may have a target kernel space driver that maps the FPGA address space to various components such as the FPGA buffer 132, host mailboxes 130, and target mailboxes 128. A target application 302 may utilize an input output interface (e.g., input/output control (Ioctl)), which may be provided by the kernel module 306, to write and read data to/from the buffer 132, host mailboxes 130, and target mailboxes 128, or other peripheral devices.

Figure 4:
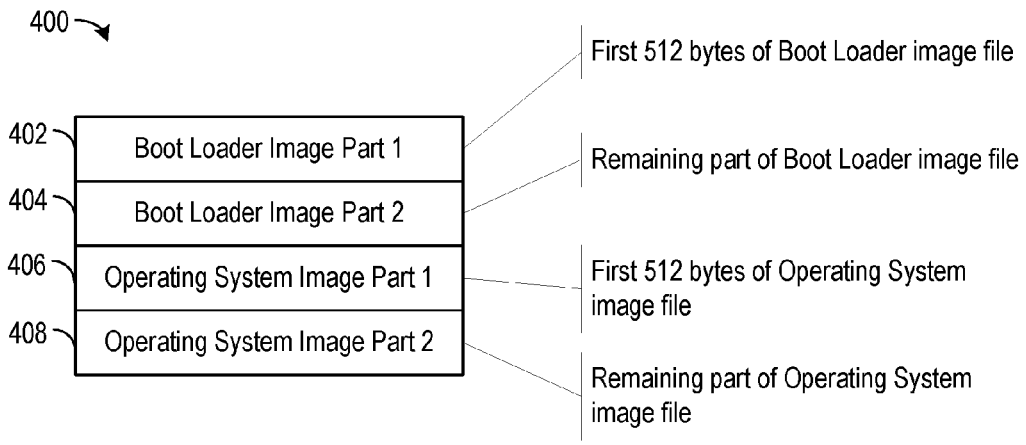
FIG. 4 is a diagram conceptually illustrating a target SOC image file in accordance with one embodiment of the disclosure.

FIG. 4 is a diagram conceptually illustrating a target SOC image file 400 in accordance with one embodiment. The target SOC image file 400 may be stored at the flash 121 (see FIGS. 1 and 3) of the target SOC 120. The SOC image file 400 may include software and/or firmware that may be executed by the target SOC (e.g., processor 122 and/or FPGA 124). In one embodiment, the SOC image 400 includes a boot loader image part one 402, a boot loader image part two 404, an operating system image part one 406, and an operating system image part two 408. In one example, the boot loader image part one 402 may include the first 512 bytes of the boot loader image, and the boot loader image part two 404 may include the remaining part of the boot loader image file. The operating system image part one 406 may include the first 512 bytes of the operating system image file, and the operating system image part two 408 may include the remaining part of the operating system image file.

Figure 5:
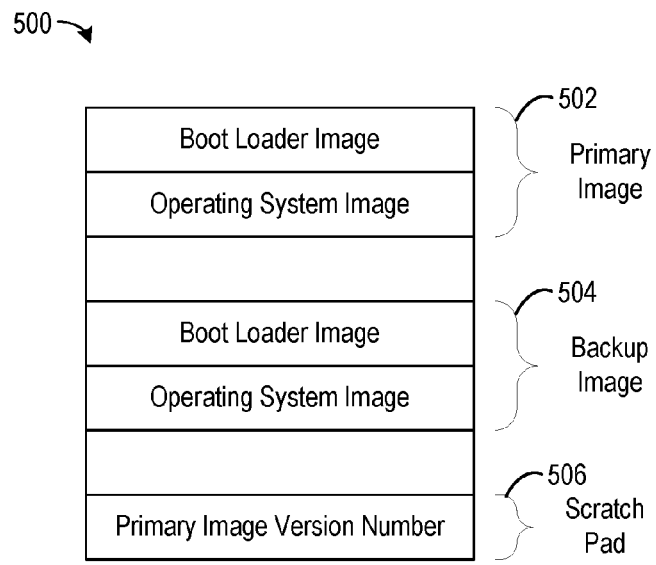
FIG. 5 is a diagram illustrating an example of target SOC flash partition in accordance with one embodiment of the disclosure.

FIG. 5 is a diagram conceptually illustrating a target SOC flash partition 500 in accordance with one embodiment. In one example, the target SOC image file 400 may be stored in the flash memory 121 (FIGS. 1 and 3) based on the target SOC flash partition 500. The target SOC flash partition 500 includes a primary image location 502, a backup image location 504, and a scratch pad 506. A first boot loader image and a first operating system image may be stored at the primary image location 502. A second boot loader image and a second operating system image may be stored at the backup image location 504. Each copy of the boot loader image and operating system image has a version number that may be used to identify the image. The scratch pad 506 may also store an image version number. The memory partition shown in FIG. 5 is illustrative in nature, and other partitions may be used to store an SOC image in the flash memory 121.

The SOC image file 400 and/or the flash memory 121 stored with the SOC image file (boot loader image and operating system image), may be called a bootrom (or boot ROM). In one embodiment, the target SOC bootrom starts executing from the primary image location 502, which may start at the bottom address (e.g., hexadecimal address 0x00) of the flash memory 121. If the SOC (e.g., processor 122 and/or FPGA 124) does not find a valid boot loader header at the primary image location 502, it may look for a valid header at every 32 kilobytes (KB) offset. When the target SOC successfully boots up the first time, it reads the scratch pad 506 for the image version number and compares it with that of the primary image 502. If the version numbers do not match, the SOC copies the primary image to the backup image location 504, and writes the new image version number to the scratch pad 506. Therefore, in the next boot-up, the primary image version number will match the version number written in the scratch pad 506.

Figure 6:
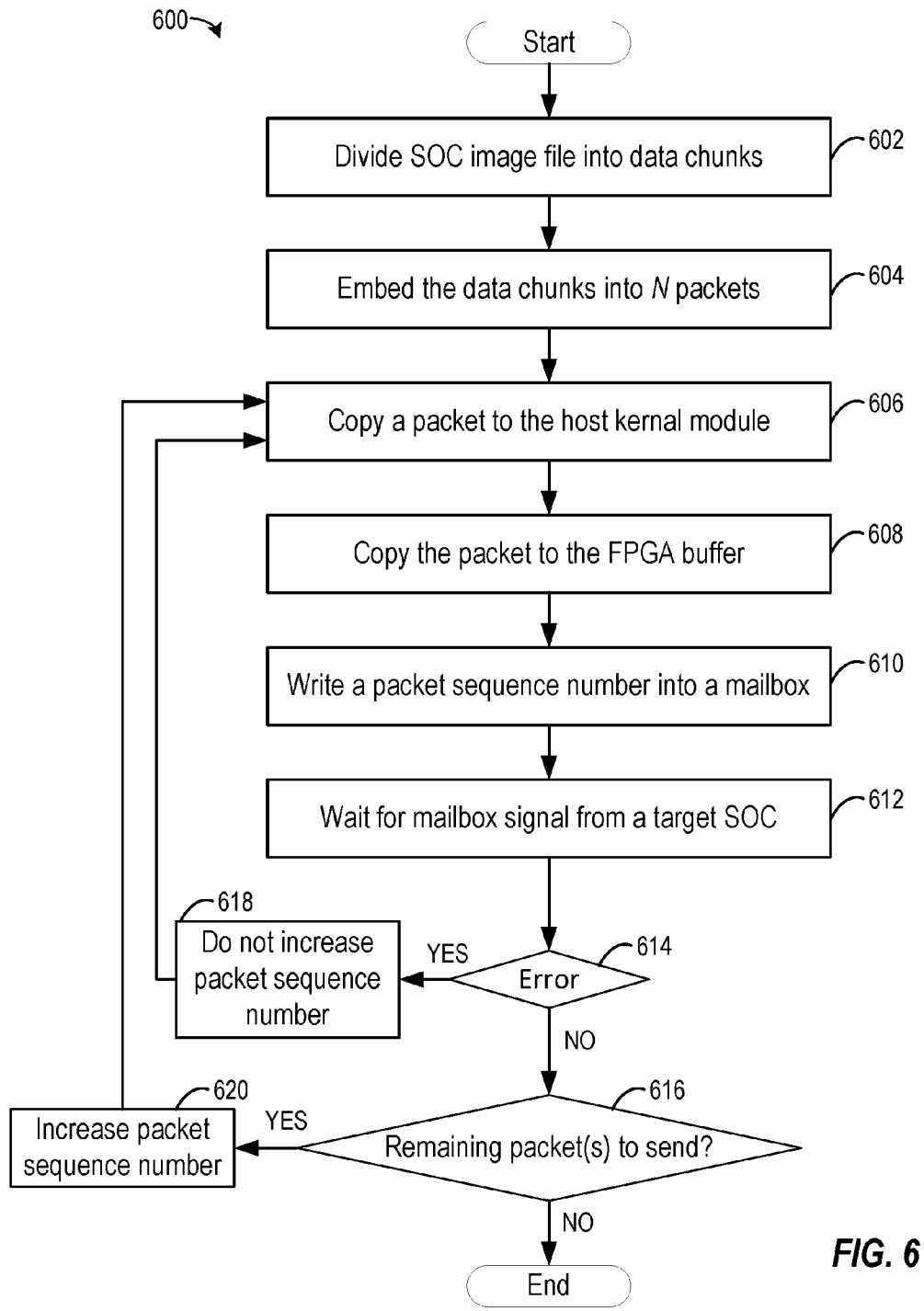
FIG. 6 is a flow chart illustrating an SOC image copy method operable at a host without using direct memory access (DMA) programming in accordance with one embodiment of the disclosure.

FIG. 6 is a flow chart illustrating a host side SOC image copy method 600 without using DMA programming in accordance with one embodiment. In one example, the SOC image copy method 600 may be performed by the host computer system 100 (host). The SOC image copy method 600 may be implemented as an application 300 (see FIG. 3) that may be executed by the host's processor 102 to copy a target SOC image from the host to a target SOC 120 system without using DMA programming or technique. At block 602, the host divides a new SOC image file into one or more data chunks or units, each including one or more bytes of data. At block 604, the host 100 embeds or packages the data chunks into one or more packets (e.g., N packets). Each of the packets may include a protocol header and one or more data chunks. The host may communicate with the target SOC 120 using any suitable communication protocols or rules. For example, the packet size may be equal to or less than that of an FPGA buffer (e.g., buffer 132 of FIG. 1) of the target SOC 120. The packets may be numbered with sequence numbers starting, for example, from 1 or any predetermined number. In one example, the sequence numbers may be 1, 2, 3 . . . N. The host 100 may store the current sequence number at the memory 106 or data storage 104.

The host 100 may copy the packets to the SOC 120 one packet at a time using mailboxes (e.g., target mailboxes 128 and host mailboxes 130) of the SOC 120. At block 606, the host 100 may copy a packet of the N packets to the host's kernel module (e.g., kernel module 340 of FIG. 3). Then, at block 608, the host's kernel module may copy the packet to the FPGA buffer of the SOC 120. Next, at block 610, the host's kernel module may write the sequence number of the packet into a target mailbox (e.g., target mailbox 128). Once the sequence number has been written to the target mailbox, the target SOC 120 sets an associated status bit 202. The operations on the SOC side will be described in detail below in reference to FIG. 7.

At block 612, the host 100 waits for a signal or indication from the target SOC that indicates whether or not the packet is successfully received by the target SOC. For example, the host 100 may read a predetermined host mailbox 130 that contains the data or information indicating whether or not the packet has been received by the target SOC. For example, the host mailbox 130 may have a corresponding status bit that can be set (e.g., bit value=1) by the target SOC after the host mailbox 130 has been written with a status message indicating whether or not the data packet is successfully received by the target SOC. More information on how the host mailbox 130 is updated by the target SOC 120 will be described below in relation to FIG. 7.

At decision block 614, based on the signal provided by the target SOC, the method proceeds to block 616 if the packet was successfully received (i.e., no error) by the target SOC; otherwise, the method proceeds to block 618. At decision block 616, the host 100 determines whether or not it still has more data packet(s) to send to the target SOC. If there are remaining packets to send, the method proceeds to 620. At block 620, the host 100 increases the sequence number of the packet and repeats the operations of block 606 through block 612 to transmit more packets. In the case that the packet was not successfully received by the target SOC, the sequence number is not increased (block 618), and the host 100 retransmits the packet by repeating the operations of blocks 606 through block 612. The above-described SOC image copying method 600 transmits one packet at a time without using DMA. In some embodiments, this method may be modified to transmit multiple packets at the same time using multiple target and host mailboxes and status bits.

Figure 7:
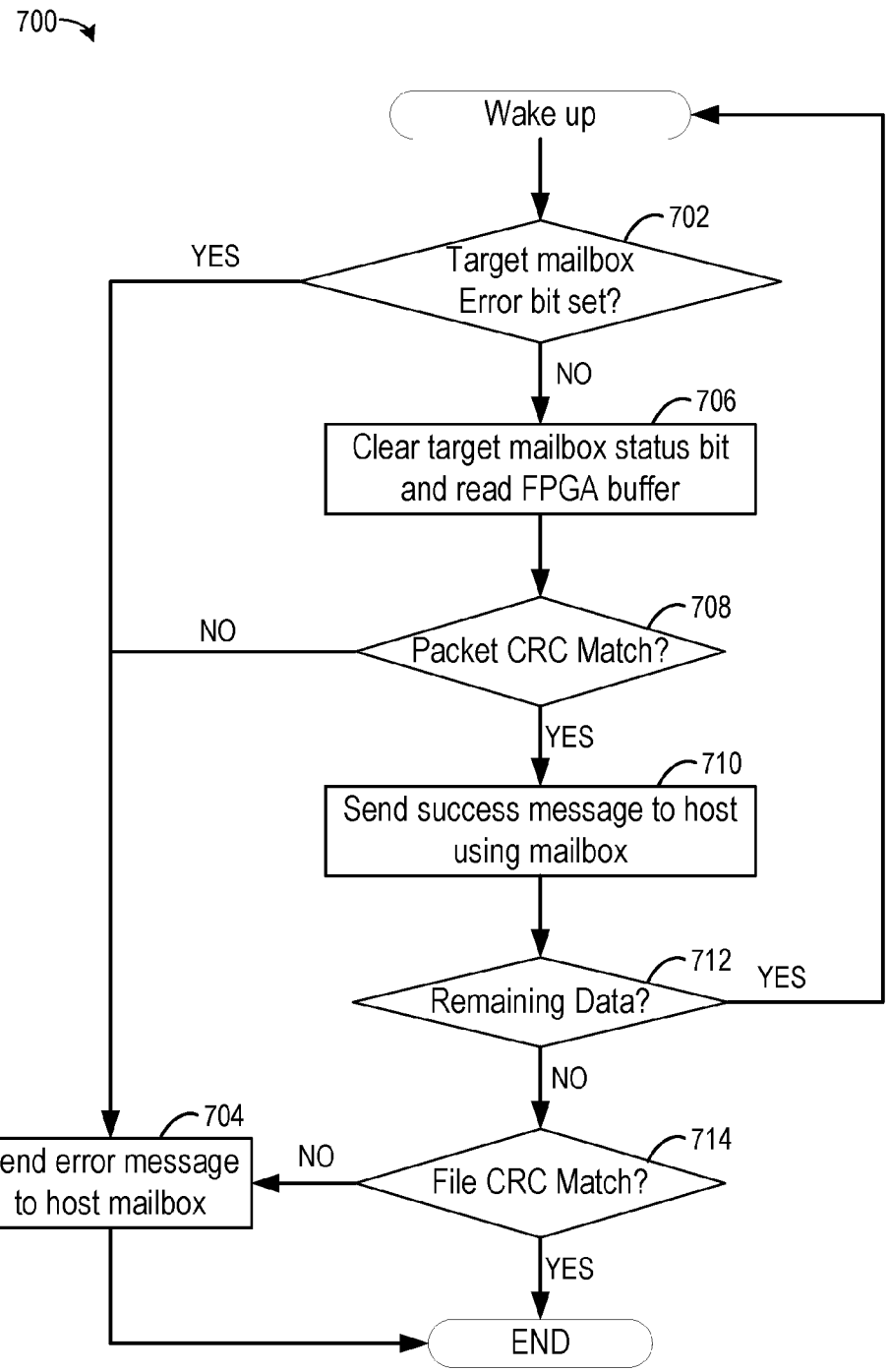
FIG. 7 is a flow chart illustrating an SOC image copy method operable at a target SOC without using DMA programming in accordance with one embodiment of the disclosure.

FIG. 7 is a flow chart illustrating an SOC side image copy method 700 without using DMA programming in accordance with one embodiment. In one example, the SOC image copy method 700 may be performed by the target SOC 120. The SOC image copy method 700 may be implemented as an application 302 (see FIG. 3) that may be executed by the target SOC's processor 122 to receive an SOC image from a host 100. This target side SOC image copy method 700 and the host side SOC image copy method 600, may operate at the same time cooperatively to copy an SOC image from the host to the target SOC. In some embodiments, the target side SOC image copy method 700 may be operated with other suitable host side SOC copy methods. In some embodiments, the host side SOC image copy method 600 may be operated with other suitable target side SOC copy methods.

As described above, a target SOC image may be divided into one or more data packets. First, the host writes a data packet into the FPGA buffer 132 (FIG. 3) of the target SOC, and then the host 100 writes the packet's sequence number to a target mailbox 128. As a result, an associated status bit 202 of the target mailbox is set (e.g., bit value=1 and automatically set upon data being written to target mailbox). The target SOC 120 may utilize a polling or interrupt method to monitor the target mailbox by checking/monitoring the status bit 202. When the status bit 202 is set, an application 302 of the target SOC and/or kernel module 306 wakes up to check the error bit 204 associated with the target mailbox 128. At decision block 702, the method checks the error bit 204. If the error bit 204 is set (i.e., error), the method proceeds to block 704; otherwise, if the error bit 204 is not set (i.e., no error), the method proceeds to block 706.

At block 704, the method sends an error message to the host by writing the error message into a predetermined host mailbox 130. In one example, the error message may include a predetermined error number or code. Furthermore, a status bit 206 associated with the host mailbox 130 may be set to indicate that new data (i.e., error message) is available for the host. For example, the host 100 may perform the operations described above in relation to block 612 (see FIG. 6) to check the status bit 206 and read the error message.

At block 706, the method clears the target mailbox status bit 202 (FIG. 2) and reads the data packet of the SOC image from the FPGA buffer 132. The sequence number of this particular data packet can be read from the corresponding target mailbox 128. The data packets may be stored temporarily at the flash memory 121, a memory 123, or other storage device. At decision block 708, the method determines whether or not the cyclic redundancy check (CRC) value of the received data packet matches to a calculated CRC. In other embodiments, other error detection or data validity check methods may be used. If the packet CRC matches the calculated CRC (i.e., no error), the method proceeds to block 710; otherwise, the method proceeds to block 704.

At block 710, the method sends a success message to the host 100 by writing a predetermined success number to the host mailbox 130 to indicate the reception status of the data packet. Furthermore, a status bit 206 associated with the host mailbox 130 may be set to indicate that new data (i.e., success message) is available. For example, the host 100 may perform the operations described above in relation to block 612 (see FIG. 6) to check the status bit 206 and read the success message.

At decision block 712, the method checks whether or not there is remaining data of the SOC image that has not been received. The SOC image size is known to the target SOC. Therefore, the target SOC may determine the number of remaining data packets yet to be received based on the number of data packets already received successfully. In some embodiments, the sequence number of the last received data packet may indicate that it is the last data packet. If there is remaining data packet(s) to be received, the method will repeat the above-described procedures at the next wakeup; otherwise, the method proceeds to decision block 714.

At decision block 714, it has been determined that all data packets of the SOC image have been received, and the method determines whether or not the received CRC of the SOC image file matches a calculated CRC of the image file. If the CRCs match, the received SOC image file is considered valid and copied successfully; otherwise, the method proceeds to block 704 to report an error to the host 100.

The above described SOC image copy methods 600 and 700 may be utilized to copy an SOC image from a host 100 to a target SOC 120 using a mailbox mechanism without DMA programming. However, these methods are not limited to copying SOC image, but may be extended to copy other data files between any devices using the described mailbox mechanism.

Figure 8:
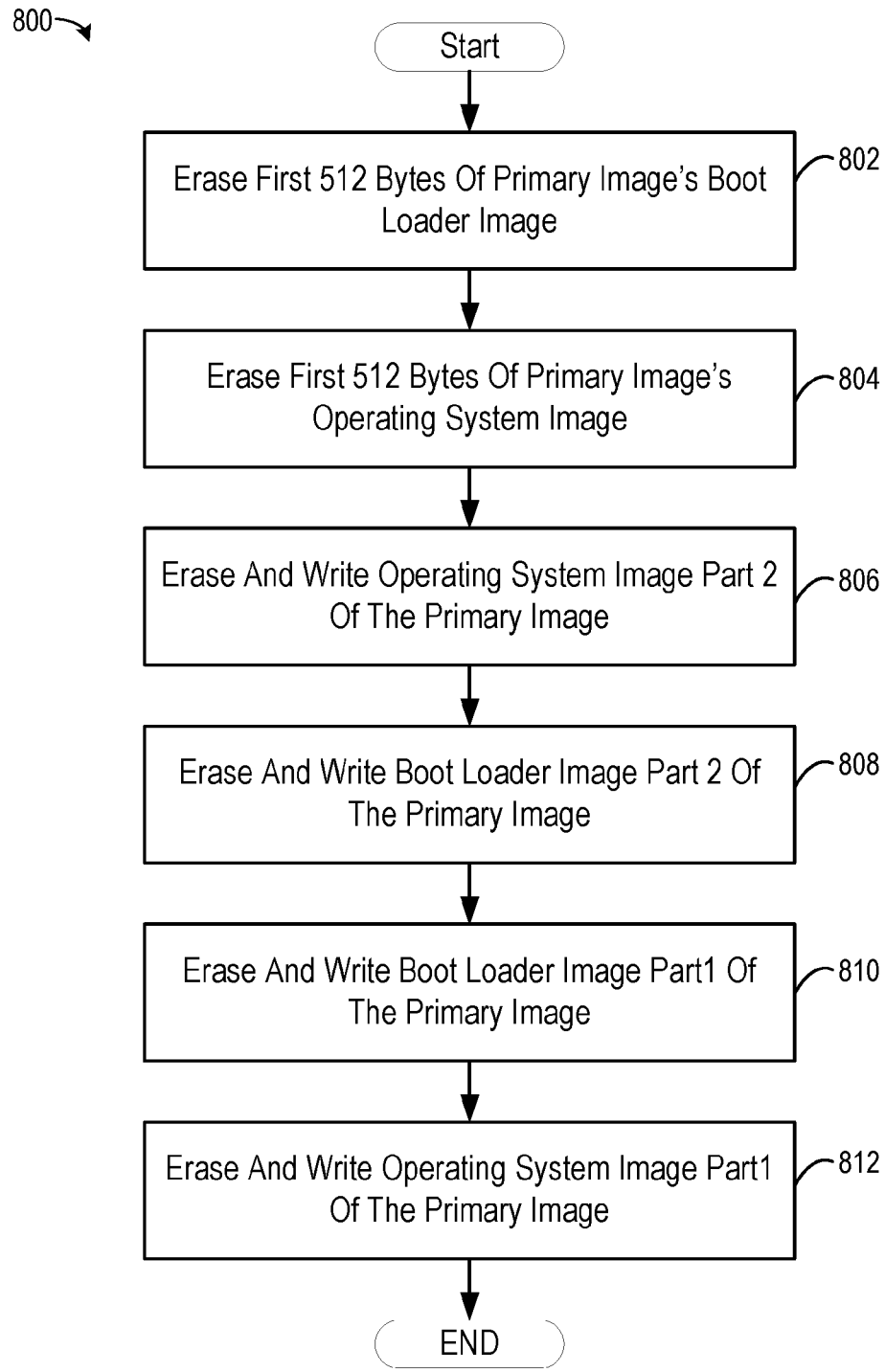
FIG. 8 is a flow chart illustrating an SOC image update method in accordance with one embodiment of the disclosure.

Once the SOC image has been copied successfully to the target SOC 120 as described above using a mailbox mechanism, the target SOC primary image may be updated to the newly received SOC image. FIG. 8 is a flow chart illustrating an SOC image update method 800 in accordance with one embodiment. In one example, this SOC image update method 800 may be an application 302 executed by a processor 122 of the target SOC 120 to update an SOC image stored at the flash 121 with a new SOC image. In an illustrative example, the SOC image update method 800 may be used to update a primary SOC image 502 as shown in FIG. 5.

At block 802, the method erases first 512 bytes of a primary image's boot loader image. If the update process is disrupted (e.g., power failure) after this procedure, the target SOC may come up using the backup image's boot loader image and primary image's operating system image (see FIG. 5). The image version in the scratch pad 506 will match that of the booted image version, so no action is needed.

At block 804, the method erases first 512 bytes of the primary image's operating system image. If the update process is disrupted (e.g., power failure) after this procedure, the target SOC may come up with the backup image's boot loader image and backup image's operating system image (see FIG. 5). The image version in the scratch pad will match to that of the booted image version, so no action is needed.

At block 806, the method erases and writes an operating system image part 2 of the primary image with a corresponding portion of the new SOC image. If the update process is disrupted (e.g., power failure) after this procedure, the target SOC may come up with the backup image's boot loader image and backup image's operating system image. The image version in the scratch pad will match to that of the booted image version, so no action is needed.

At block 808, the method erases and writes boot loader image part 2 of the primary image with a corresponding portion of the new SOC image. If the update process is disrupted (e.g., power failure) after this procedure, the target SOC may come up with the backup image's boot loader image and backup image's operating system image. The image version in the scratch pad will match to that of the booted image version, so no action is needed.

At block 810, the method erases and writes boot loader image part 1 of the primary image with a corresponding portion of the new SOC image. If the update process is disrupted (e.g., power failure) after this procedure, the target SOC may come up with the new primary image's boot loader image and backup image's operating system image. The image version in the scratch pad will match to that of the booted image version, so no action is needed.

At block 812, the method erases and writes operating system image part 1 of the primary image with a correspond part of the updated SOC image. If the update process is disrupted (e.g., power failure) after this procedure, the target SOC may come up with the new primary image's boot loader image and operating system image. The image version in the scratch pad will not match to that of the booted image version, so the SOC copies the new primary image to the backup image location and writes the new image version to the scratch pad.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for updating a system on chip (SOC) image operable at a target SOC comprising a buffer, a target mailbox, and a host mailbox, the method comprising:
    monitoring the target mailbox to determine reception of a data packet of an SOC image received from a host computer, wherein the SOC image comprises a plurality of data packets;
    reading the data packet from the buffer;
    writing a status message to the host mailbox, wherein the status message is indicative of a reception status of the data packet; and
    setting a host status bit associated with the host mailbox to indicate to the host computer an availability of the status message.

2. The method of claim 1,
    wherein the monitoring the target mailbox comprises monitoring a target status bit associated with the target mailbox, and
    wherein the target status bit is indicative of an availability of the data packet in the buffer.

3. The method of claim 2, further comprising:
    clearing the target status bit in connection with reading the data packet from the buffer.

4. The method of claim 1,
    wherein the monitoring the target mailbox comprises monitoring an error bit associated with the target mailbox, and
    wherein the error bit is indicative of an error in the data packet in the buffer.

5. The method of claim 4, further comprising setting the error bit when the target mailbox is written at least twice consecutively by the host computer.

6. The method of claim 1, further comprising:
    reading a sequence number of the data packet from the target mailbox; and
    if the sequence number indicates the data packet is a last one of the plurality of data packets, updating the target SOC with a received SOC image comprising at least the data packet.

7. The method of claim 1, wherein the writing the status message to the host mailbox comprises:
    if an error bit associated with the target mailbox is set, writing a first value to the host mailbox indicative of an error in receiving the data packet; and
    if the error bit associated with the target mailbox is not set, writing a second value to the host mailbox indicative of a success in receiving the data packet.

8. A method for operating a host computer to update a system on chip (SOC) image of a target SOC comprising a buffer, a target mailbox, and a host mailbox, the method comprising:
    copying a first data packet of an SOC image to the buffer, wherein the SOC image comprises a plurality of data packets;
    writing a first sequence number of the first data packet to the target mailbox;
    checking a host status bit associated with the host mailbox to determine a status message from the target SOC; and
    reading the status message from the host mailbox, wherein the status message is indicative of a reception status of the first data packet.

9. The method of claim 8, further comprising:
    if the status message indicates a reception error, writing the first data packet to the buffer for a second time.

10. The method of claim 8, further comprising:
    if the status message indicates no reception error:
        writing a second data packet of the plurality of data packets to the buffer; and
        writing a second sequence number of the second data packet to the target mailbox.

11. The method of claim 8, wherein the copying the first data packet involves no direct memory access (DMA).

12. A system on chip (SOC) system comprising:
    a processor;

a buffer coupled to the processor and configured to receive a data packet of an SOC image from a host computer via a communication interface, wherein the SOC image comprises a plurality of data packets;

a target mailbox coupled to the processor and configured to receive a message from the host computer, wherein the message comprises a sequence number of the data packet received in the buffer;

a host mailbox coupled to the processor and configured to provide a status message to the host computer, wherein the status message is indicative of a reception status of the data packet; and a host status bit associated with the host mailbox, the host status bit is configured to indicate to the host computer an availability of the status message.

13. The SOC system of claim 12, further comprising:
a target status bit associated with the target mailbox, wherein the target status bit is indicative of an availability of the data packet in the buffer.

14. The SOC system of claim 13, wherein the target status bit is configured to be cleared when the data packet is read from the buffer.

15. The SOC system of claim 12, further comprising:
an error bit associated with the target mailbox, wherein the error bit is indicative of an error in the data packet in the buffer.

16. The SOC system of claim 15, wherein the error bit is configured to be set when the target mailbox being written at least twice consecutively by the host computer.

17. The SOC system of claim 12, further comprising:
a flash memory comprising an image file,
wherein if the sequence number indicates the received data packet is a last one of the plurality of data packets, the processor is configured to update the image file with a received SOC image comprising at least the data packet.

18. The SOC system of claim 12, further comprising:
an error bit associated with the target mailbox,
wherein the processor is configured to:
if the error bit is set, write a first value to the host mailbox indicative of an error in receiving the data packet; and
if the error bit is not set, write a second value to the host mailbox indicative of a success in receiving the data packet.

19. A host computer configured to update a system on chip (SOC) image of a target SOC, comprising:
a processor;
a communication interference configured to communicate with a target SOC comprising a buffer, a target mailbox, and a host mailbox; and
a memory coupled to the processor and comprising an SOC update application,
wherein the processor, when executing the SOC update application, is configured to:
copy a first data packet of an SOC image to the buffer, wherein the SOC image comprises a plurality of data packets;
write a first sequence number of the first data packet to the target mailbox;
check a host status bit associated with the host mailbox to determine a status message from the target SOC; and
read the status message from the host mailbox, wherein the status message is indicative of a reception status of the first data packet.

20. The host computer of claim 19, wherein the processor is further configured to:
if the status message indicates a reception error, write the first data packet to the buffer for a second time.

21. The host computer of claim 19, wherein the processor is further configured to:
if the status message indicates no reception error:
write a second data packet of the plurality of data packets to the buffer; and
write a second sequence number of the second data packet to the target mailbox.

* * * * *